May 21, 1940. J. D. BEEBE 2,201,422
PRESSURE ARM STRUCTURE
Filed May 18, 1939
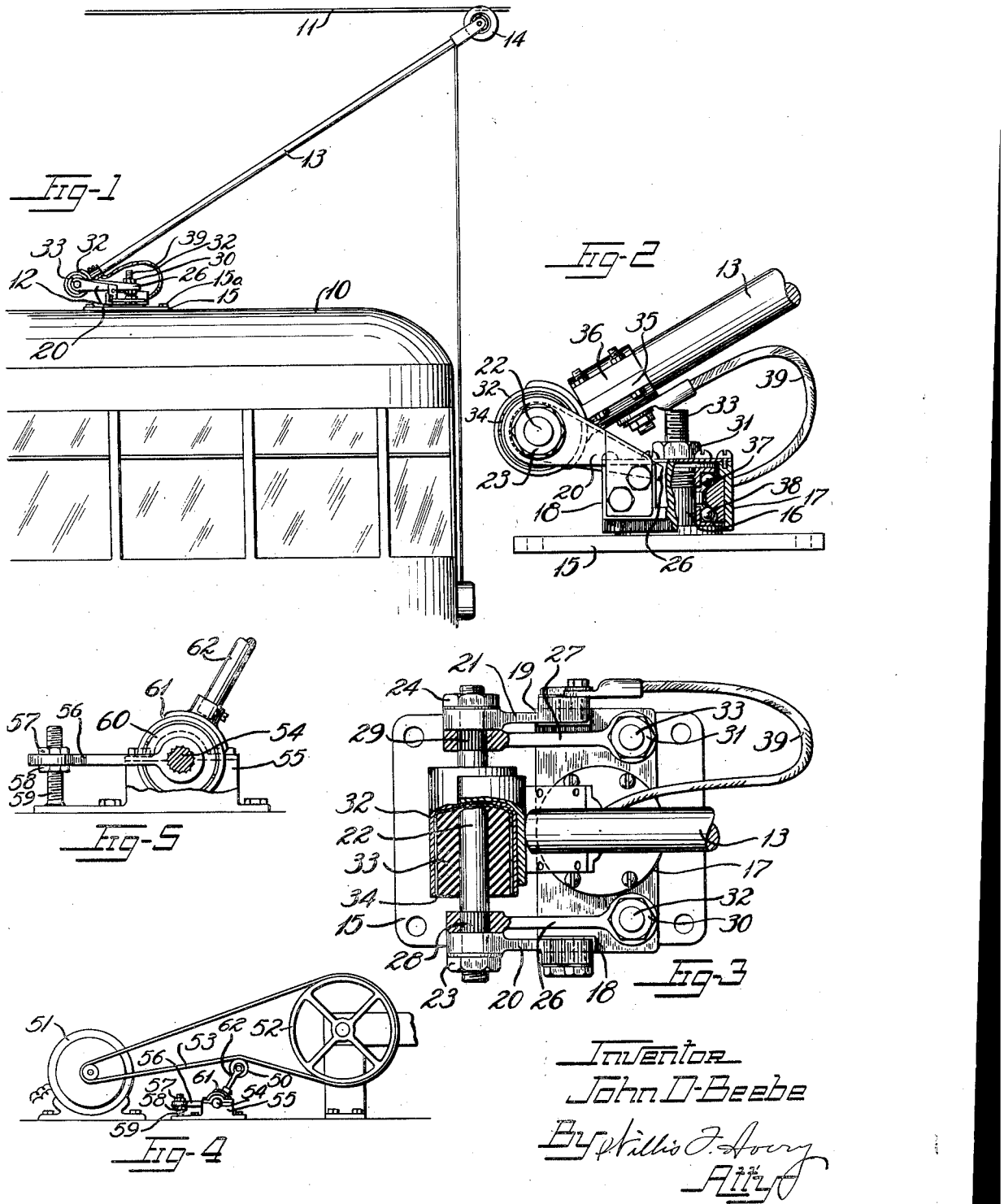
Inventor
John D. Beebe
By Willis J. Avery
Atty Patented May 21, 1940

2,201,422

UNITED STATES PATENT OFFICE 2,201,422

PRESSURE ARM STRUCTURE

John D. Beebe, Silver Lake, Ohio, assignor to The B. F. Goodrich Company, New York, N. Y., a corporation of New York Application May 18, 1939, Serial No. 274,411

5 Claims. (Cl. 191—69)

This invention relates to pressure arm structures such as trolley pole mountings, and is especially useful where a trolley pole is to be mounted on an electric vehicle, or where a spring trolley pole or other pressure arm structure is to be used in other locations as in belt tighteners or the like.

The principal objects of the invention are to provide a pressure arm structure for compact and durable construction providing effectively for resiliency, absorption of noise-generating vibration and electrical insulation, to permit universal movement, to provide convenient adjustability of tension, and to provide economy of manufacture and efficiency of operation.

Further objects will appear from the following description and the accompanying drawing.

Of the drawing:

Fig. 1 is a side elevation of a portion of an electric vehicle and a trolley wire showing a trolley pole and its mounting constructed according to and embodying the invention.

Fig. 2 is a side elevation of the mounting of Fig. 1, parts being broken away and parts shown in section.

Fig. 3 is a plan view of the same, parts being broken away and parts shown in section.

Fig. 4 is a side elevation of a belt drive showing a belt tightener constructed according to and embodying the invention.

Fig. 5 is a side elevation of the mounting of Fig. 4, parts being broken away and parts shown in section.

Referring to the drawing, and first to Fig. 1, the numeral 10 designates an electric vehicle such as a trolley car, and the numeral 11 a trolley wire thereover. A swivel mounting 12 supports a trolley pole or arm 13 from the top of the car so that its trolley wheel 14 engages the wire in rolling contact.

The mounting 12 is illustrated in detail in Figs. 2 and 3. It comprises a base 15 adapted to be fixed to the top of the car by bolts 15ᵃ and having a vertical swivel post 16 about which a swivel carriage 17 is rotatably mounted. Arms 18, 19 extend from the swivel carriage and have spaced ears 20, 21 in which a horizontal rock shaft 22 is rigidly secured, as by nuts 23, 24 threaded on reduced ends of the shaft extending through the ears. Rotation of the shaft is further prevented by a pair of arms 26, 27. These arms have splined portions which engage similar splined portions of shaft 22, as at 28, 29, the shaft having a multiplicity of equally spaced keys which engage a similar set of keyways in an arm, the arrangement being such that the arms may be non-rotatably secured to the shaft in a multiplicity of positions for adjustment. The extending ends of arms 26, 27 are secured between nuts 30, 31 threaded on vertical studs 32, 33 which are fixed to the swivel carriage 17. The arrangement is such that the shaft may be rotatably adjusted by screwing the nuts up and down the studs and greater adjustment may be made by shifting the arms with respect to the shaft.

A sleeve 32 surrounds the shaft 22 in spaced relation thereto and is attached to the shaft by a torsion bushing 33 of rubber or other rubber-like material preferably assembled therebetween under compression. The rubber bushing is preferably vulcanized to the shaft 22 and forced within the sleeve 32. For this purpose a split or otherwise circumferentially discontinuous sleeve 34 of metal may be secured to the rubber as by vulcanized adhesion and the sleeve 34 reduced in circumference and forced into the sleeve 32 so that the rubber body will be held in a state of radial compression. This increases the resistance of the rubber to slippage, reduces undesirable wobbling of the shaft in the rubber, and facilitates quality manufacture.

Fixed to the sleeve 32 is the fixed member 35 of a split clamp sleeve, between which and the other clamp sleeve member 36, the trolley pole 13 is clamped.

The torsion bushing 33 permits rotative movement of the sleeve 32 about the shaft 22 while resiliently resisting such movement. The trolley pole 13 acts as a lever causing rotational deflection of the torsion bushing under the weight of the trolley wire while the bushing acts as a spring to keep the trolley in contact. Vibration set up in the trolley pole is damped by the rubber bushing so that noise resulting from the mounting of the pole on the roof of the car is substantially decreased or eliminated.

To provide for lateral movement of the trolley pole and for reversing the travel of the vehicle the swivel joint is provided, the ball bearings 37, 38 are provided to reduce friction. Some lateral movement of the trolley pole is permitted by the resilience of the bushing 33, a small deflection of the bushing permitting considerable lateral movement at the end of the pole. The rubber bushing acts as a protecting electrical insulator and electricity may be conducted from the pole 13 to the swivel carriage 17 by a flexible conductor 39 of such extent as to permit full movement of the pole.

As shown in Figs. 4 and 5 an arm structure in the form of pole mounting may be used for pressing an idler pulley 50 against a transmission belt. In this illustration, the numeral 51 designates an electric motor, 52 a pulley to be driven, and 53 a transmission belt. In this case a swivel is unnecessary and the shaft 54 is rotatably mounted in a pillow block 55 and is retained against rotation by an arm 56 keyed to the shaft 54 and having its end clamped against rotation between nuts 57, 58 threaded to a stud 59 fixed to the block 55. The arm 56 has adjustable engagement with the shaft 54 as by having a multiplicity of keyways equally spaced and engageable with a multiplicity of keys on the shaft in a multiplicity of radial adjustments. A torsion bushing 60 of rubber is mounted, preferably under compression, between the shaft 54 and a bushing 61 to which the arm 62 which carries the tension roller is attached. Adjustments of tension of the belt may be made by adjusting the nuts 57, 58 and thereby adjusting the tension on the torsion bushing.

These and other variations may be made without departing from the invention as it is defined by the following claims:

I claim:

1. A trolley pole mounting for supporting the pole for swinging movement against resilient pressure, said mounting comprising an inner member, an outer circumferentially discontinuous sleeve member, one of said members being held against rotation and the other of said members being adapted to support the pole, and a body of resilient rubber-like material mounted between said members in a manner to resist swinging movement of the pole by torsional stress on said body of rubber-like material and to provide electrical and vibration insulation between said members, means being provided for holding said outer sleeve member and body pressed toward said inner member.

2. A trolley pole mounting comprising a bearing, a shaft mounted for rotation therein, an arm fixed to said shaft, means for adjustably locking the arm in any desired position against movement of the shaft with respect to said bearing, a body of resilient rubber-like material on said shaft, and a trolley pole holder mounted on said body in a manner to resist swinging movement of the holder by torsional stress on said body, and said body providing electrical and vibration insulation between said holder and shaft.

3. A trolley pole mounting comprising a holder for engaging the base of a trolley pole, a resilient torsion bushing of rubber-like material extending crosswise thereof, a shaft fixed to the torsion bushing and extending therethrough, and means for adjustably locking the shaft in any desired position against rotation for tensioning said torsion bushing.

4. A trolley pole mounting comprising a holder for engaging the base of a trolley pole, a rocking member mounted for movement about an axis perpendicular to the plane of normal movement of the trolley pole, resilient means comprising a body of resilient rubber-like material mounted between said holder and said rocking member and adapted to be torsionally tensioned to resist movement of said pole and simultaneously providing electrical and vibration insulation between said holder and rocking member, means for adjusting said rocking member about its axis to tension said resilient means, and means for locking said rocking member against movement in its adjusted position.

5. A trolley pole mounting comprising a swivel carriage mounted on a vehicle for rotation about a vertical axis, a rock shaft member journaled horizontally therein, a trolley pole holding member about said rock shaft, a resilient rubber torsion bushing between said shaft member and said holding member and fixed to both members for tensioning said pole and simultaneously providing electrical and vibration insulation between said shaft and holding members, and means for locking said shaft member with relation to said swivel carriage, said means being adjustable to lock said shaft in any position for tensioning said bushing.

JOHN D. BEEBE.